United States Patent [19]

Chianelli

[11] 4,208,394

[45] Jun. 17, 1980

[54] COMMERCIAL PRODUCTION OF TRANSITION METAL SULFIDES FROM THEIR HALIDES

[75] Inventor: Russell R. Chianelli, Brooklyn, N.Y.

[73] Assignee: Exxon Research & Engineering Co., Florham Park, N.J.

[21] Appl. No.: 637,222

[22] Filed: Dec. 3, 1975

[51] Int. Cl.$^2$ .............................................. C01B 17/00
[52] U.S. Cl. ................................................ 423/561 R
[58] Field of Search ............... 260/664; 423/439, 462, 423/561, 443, 444

[56] References Cited

U.S. PATENT DOCUMENTS

| | | |
|---|---|---|
| 2,556,912 | 6/1951 | Gardner |
| 3,113,977 | 12/1963 | Seitzer .................................. 260/664 |

FOREIGN PATENT DOCUMENTS

| | | | |
|---|---|---|---|
| 250911 | 12/1966 | Austria ................................ 423/561 R |
| 1224288 | 9/1966 | Fed. Rep. of Germany ...... 423/561 R |
| 630042 | 10/1949 | United Kingdom ................ 423/561 R |
| 1344076 | 1/1974 | United Kingdom ................ 423/561 R |

OTHER PUBLICATIONS

Mellor, J. W., A Comprehensive Treatise on Inorganic & Theoretical Chemistry, Longmans & Green & Co., N.Y., N.Y., 1925, vol. VI, p. 114, vol. VII, pp. 90 & 91.

*Primary Examiner*—O. R. Vertiz
*Assistant Examiner*—Gary P. Straub
*Attorney, Agent, or Firm*—Joseph J. Dvorak

[57] ABSTRACT

Sulfides of Group IVb and Vb transition metals are produced by reacting their halides with carbon disulfide. The reactions can be between liquid or gaseous halides and liquid or gaseous carbon disulfide. The reaction products are formed and recovered as solids and the other reaction product, carbon tetrahalide, is carried off as a gas and recovered. A specific example is the production of titanium disulfide by reacting titanium tetrachloride with carbon disulfide.

16 Claims, No Drawings

COMMERCIAL PRODUCTION OF TRANSITION METAL SULFIDES FROM THEIR HALIDES

BACKGROUND OF THE INVENTION

The present invention relates to the production of sulfides of Groups IVb and Vb transition metals and more particularly to the production of the transition metal sulfides on a commercial scale.

Titanium disulfide has a layered structure in which a single layer of titanium atoms is sandwiched between two layers of sulfur atoms and successive layered structures are weakly bound by van der Waal forces. This layered structure of titanium disulfide provides it with many unique properties. For example, titanium disulfide can be intercalated with Lewis bases and the resulting composition has many uses such as a lubricant. See U.S. Pat. No. 3,766,064 for additional uses of intercalated layered compounds, including intercalated titanium disulfide.

Titanium disulfide also finds great uses as electrode material in batteries, particularly as a cathode material or secondary high energy density battery. Titanium disulfide can be repeatedly intercalated and disintercalated corresponding to discharging and charging, respectively, in a battery, without significant deterioration of its ability to be intercalated and disintercalated. Moreover, when used in conjunction with alkali metal containing anodes, titanium disulfide cathodes provide high electropotentials, thereby insuring high energy cells. To be useful as a cathode material, titanium disulfide should display a number of characteristics including stoichiometry, minimal crystal defects and a small particle size. Stoichiometry and minimal crystal defects insure maximum and efficient intercalation and disintercalation while small crystals enhance electrolyte access, thereby minimizing concentration polarization in battery environments. Titanium disulfide has generally been prepared by direct reaction between metallic titanium and elemental sulfur at elevated temperatures or by the reaction of titanium tetrachloride with gaseous hydrogen sulfide at elevated temperatures. Titanium disulfide has also been prepared by halide transport techniques. Although these processes provide compounds of titanium and sulfur, most processes require extremely close control and present various problems in scaling the process up to commercial production rate. Close control is required because at the elevated temperatures commonly employed, titanium disulfide becomes increasingly less stable, making composition control more difficult. For example, when producing titanium disulfide from hydrogen sulfide and titanium tetrachloride at elevated temperatures, the reverse reaction involving the dissociation of HCl becomes important and thus the yields are poor and the product is contaminated with $Cl_2$. Also, when producing titanium disulfide directly from metallic titanium and elemental sulfur, the reaction is highly exothermic so that care must be exercised to insure stoichiometry and preferred crystal size. High production temperatures can induce crystalline imperfections and increase the average particle size of the final product.

The other sulfides of the transition metals of Groups IVb and Vb have the layered structure of titanium disulfide and accordingly have similar uses as titanium disulfide. The production of these transition metal sulfides encounters similar problems as those found in the production of titanium disulfide.

BRIEF SUMMARY OF THE INVENTION

Generally speaking, the present invention relates to the production of sulfides of Groups IVb and Vb transition metals in one step. Halides of the transition metals are reacted with carbon disulfide to form carbon tetrahalide and solid transition metal sulfides which can be easily separated from the reactants.

The term "Group" as applied to one or more elements or compounds refers to a specific Group of the Periodic Table of the Elements of the type set forth on the inside cover of Lange's Handbook of Chemistry (11th Edition).

DETAILED DESCRIPTION

In carrying the present invention into practice, a halide of at least one Group IVb or Vb transition metal is reacted with carbon disulfide to form the transition metal sulfide and carbon tetrahalide as follows:

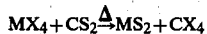

wherein M is at least one Group IVb or Vb transition metal selected from the group consisting of titanium, zirconium, hafnium, vanadium, niobium and tantalum and X is at least one halide. Solid sulfide is formed as the reaction proceeds and can be readily separated from the reactants, thereby insuring rapid and complete reaction. The process can be conducted on a batch, semi-continuous or continuous basis. For example, titanium tetrahalide and carbon disulfide can be continuously fed to a reactor and the carbon tetrahalide can be continuously removed while titanium disulfide is removed periodically.

Advantageously, the titanium halide is titanium tetrachloride. Titanium tetrachloride has a number of properties that make it useful in the practice of the process in accordance with the present invention. Titanium tetrachloride has low melting and boiling points both of which facilitate reaction with carbon disulfide at lower temperatures and is comparatively inexpensive. Titanium in titanium tetrachloride is in the tetravalent state in which state the reaction with carbon disulfide is a replacement reaction not involving further oxidation or reduction of the titanium atom as would be the case with titanium in other oxidation states. If titanium in the tetravalent state is employed, the reaction proceeds at lower temperatures at commercially attractive rates without generating excessive amounts of heat thereby minimizing the adverse temperature effects of stoichiometry departures, greater departures from crystal imperfection and larger particle size. Because titanium chlorides, particularly titanium tetrachloride, and carbon disulfide have low melting and boiling points, the reaction therebetween can be conducted in the gaseous, liquid or mixed states. For example, a liquid mixture of titanium tetrachloride and carbon disulfide can be formed and heated, either under atmospheric or under superatmospheric pressure, whereby the titanium chloride and carbon disulfide react to form solid titanium disulfide which is precipitated. Alternatively, the titanium chloride and carbon disulfide can be vaporized and then reacted in the gaseous state to form solid titanium disulfide which is precipitated from the gaseous state. Of course, diluents, either gaseous or liquid, can be employed to control the temperature, rate of reaction and product particle size.

The replacement reaction between titanium tetrachloride and carbon disulfide can be conducted over a wide range of temperatures up to about 850° C. However, at temperatures materially above 750° C., the departures from stoichiometry, crystal perfection and particle size for battery grade titanium disulfide become unacceptably high. On the other hand, at temperatures significantly below about 350° C., the reaction proceeds at such a slow rate that the process becomes commercially impractical. Therefore, those properties of titanium disulfide associated with good battery performance can be obtained by reacting titanium tetrachloride and carbon disulfide at a temperature between about 400° C. and 800° C. Most advantageously, the reaction is conducted at temperatures between about 600° C. and 750° C. The reaction can be conducted at ambient pressures or at superatmospheric pressures in order to control both the physical and chemical properties of the resultant titanium disulfide. For example, the reaction can be carried out in a sealed Pyrex tube up to about 700° C. in which case the $TiS_2$ is actually formed in solution because of the pressure of about 15 atmospheres. An advantageous feature of the present invention is that when carbon disulfide is used in the liquid state and titanium disulfide is precipitated from solution, both the carbon disulfide and the carbon tetrachloride act to wash the titanium disulfide so that any elemental sulfur is dissolved by the carbon disulfide while carbon tetrachloride acts to dissolve other impurities such as chlorine.

The process in accordance with the present invention can be conducted on a batch, semi-continuous or continuous basis. Because the reaction can be conducted at temperatures at which titanium disulfide is thermally stable, the reaction does not have to be conducted in a closed vessel and additional reactants can be continuously added to the reactor as the reaction proceeds. Moreover, the reaction is substantially less energetic than the reaction between metallic titanium and elemental sulfur and temperature control is not such a severe problem that the process can be continuously run on a commercial scale without encountering hazardous explosions caused by excessive spontaneous heat evolution.

Although the present invention has been described by reference primarily to the production of titanium disulfide, it will be appreciated that the sulfides of the other transition metals of Groups IVb and Vb can be produced in the same manner as shown in Example III below with minor adjustments in temperatures, times and pressures to accommodate the physical and chemical properties of the reactants and the reactions involved. In addition, when it is desired to produce a disulfide of the transition metals, tetravalent or pentavalent halides of the transition metals are used as one of the starting materials.

In order to give those skilled in the art a better understanding of the present invention, the following illustrative examples are given:

EXAMPLE I

A quartz tube was heated to between 650° C. and 750° C. to provide a reaction zone. Separate baths of carbon disulfide at room temperature and titanium tetrachloride at 100° C. were established and a carrier gas of dry nitrogen was continuously bubbled through the baths to produce two gaseous streams having stoichiometric amounts of carbon disulfide and titanium tetrachloride. The gaseous streams containing the reactants were injected into the reaction zone where crystals of titanium disulfide, as identified by X-ray diffraction, were formed on the walls of the quartz tube.

Different reaction temperatures were tested. At lower temperatures, i.e. 680° C., titanium disulfide crystals were formed in the reaction zone and were then transported by and redeposited by the carrier gas on the quartz tube walls just outside of the reaction zone. With higher reaction temperatures, i.e. 750° C., titanium disulfide crystals were formed throughout the reaction zone.

Reaction rates and crystal size were controlled by variation of the rate of carrier gas flow. A carrier gas flow rate of one cubic centimeter per minute produced crystals with a larger particle size and increasing the flow rate increased the reaction rate but lowered the average particle size of the titanium disulfide.

EXAMPLE II

A one milliliter mixture of titanium tetrachloride and carbon disulfide in a molar ratio of 1:1 was placed in a Pyrex tube. The tube was immersed in a mixture of dry ice and acetone to solidify the titanium tetrachloridecarbon disulfide mixture so that the Pyrex tube could be evacuated without undue loss of either of the reactants. The tube was evacuated and sealed. The sealed tube was heated to 700° C. and held at that temperature overnight. After cooling, the Pyrex tube was opened and found to contain well-formed titanium disulfide crystals in the liquid carbon tetrachloride. The crystal size could be controlled by regulating the rate of heating to the reaction temperature.

EXAMPLE III

Solid niobium pentachloride was placed in a ceramic boat which was then placed in a quartz tube. The quartz tube was placed in a furnace such that a reaction zone at 700° C. was established and such that the ceramic boat and its contents were maintained at about 300° C. at which temperature the partial pressure of niobium pentachloride is equal to the partial pressure of carbon disulfide at room temperature. Dry nitrogen was bubbled through a bath of carbon disulfide at room temperature, and the carbon-disulfide-saturated nitrogen fed into the quartz tube where it is passed over the heated niobium pentachloride. Under these conditions the carrier gas contained approximately equal molar ratios of the reactants as it entered the reaction. In the reaction zone the niobium pentachloride reacted with the carbon disulfide as follows:

$NbCl_5 + CS_2 \rightarrow NbS_2 + CCl_4 + \frac{1}{2}Cl_2$

Niobium disulfide crystals were formed on the walls of the quartz tube in the reaction zone.

Hafnium disulfide was prepared in a similar manner.

What is claimed is:

1. A process for producing a transition metal disulfide which consisting of reacting a halide selected from tetravalent and pentavalent halides of at least one transition metal selected from Groups IVB or VB of the Periodic Table of the Elements with carbon disulfide at a temperature between about 400° C. and 800° C. to form the transition metal disulfide.

2. The process as described in claim 1 wherein the halide of said transition metal is a chloride.

3. The process as described in claim 2 wherein the chloride of the transition metal is titanium tetrachloride.

4. The process as described in claim 3 wherein the carbon disulfide and the titanium tetrachloride are both in the liquid state.

5. The process as described in claim 3 wherein the titanium tetrachloride and the carbon disulfide are in the gaseous state.

6. The process as described in claim 3 wherein the reaction is conducted at ambient pressures.

7. The process as described in claim 3 wherein the process is conducted at superatmospheric pressures.

8. The process as described in claim 3 wherein a diluent is present in order to control the rate of reaction.

9. The process as described in claim 2 wherein the chloride of the transition metal is zirconium tetrachloride.

10. The process as described in claim 2 wherein the chloride of the transition metal is hafnium tetrachloride.

11. The process as described in claim 2 wherein the chloride of the transition metal is niobium pentachloride.

12. The process as described in claim 2 wherein the chloride of the transition metal is tantalum pentachloride.

13. The process as described in claim 2 wherein the chloride of the transition metal is vanadium tetrachloride.

14. A process for producing a sulfide of at least one transition metal selected from the group consisting of Grous IVb or Vb of the Periodic Table of the Elements which consisting of establishing a reaction zone heated to a temperature between about 400° C. and 800° C. in reactor and flowing at least one gaseous stream of a carrier gas and vapors of at least one halide of the Group IVb or Vb transition metal and of carbon disulfide through the reaction zone whereby the transition metal halide reacts with the carbon disulfide to produce a disulfide of the transition metal.

15. The process as described in claim 14 wherein the vapors of the transition metal halide and the carbon disulfide are present in the carrier gas in a molar ratio of about 1:1.

16. A process for producing a sulfide of at least one transition metal selected from the group consisting of Groups IVb or Vb of the Periodic Table of the Elements which consisting of feeding at least one halide of the Group IVb or Vb transition metal and carbon disulfide to a reaction vessel, evacuating the vessel, sealing the evacuated vessel and then heating the sealed vessel to between about 400° and 800° at which temperature the halide reacts with the carbon disulfide to form a disulfide of the transition metal.

* * * * *